US009097149B2

(12) United States Patent
Beshay et al.

(10) Patent No.: US 9,097,149 B2
(45) Date of Patent: Aug. 4, 2015

(54) ASPIRATOR FOR CRANKCASE VENTILATION AND VACUUM GENERATION

(75) Inventors: Mansour Beshay, Ann Arbor, MI (US); Todd Anthony Rumpsa, Saline, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 13/549,226

(22) Filed: Jul. 13, 2012

(65) Prior Publication Data
US 2014/0014080 A1    Jan. 16, 2014

(51) Int. Cl.
F01M 13/02 (2006.01)

(52) U.S. Cl.
CPC ........... F01M 13/023 (2013.01); F01M 13/022 (2013.01); F01M 2013/026 (2013.01); Y02T 10/146 (2013.01)

(58) Field of Classification Search
USPC ...................................... 123/572–574, 41.86
See application file for complete search history.

(56) References Cited

U.S. PATENT DOCUMENTS

| | | | | |
|---|---|---|---|---|
| 2,080,588 A | * | 5/1937 | Whittington | 123/574 |
| 2,362,558 A | * | 11/1944 | Janzich | 123/574 |
| 3,157,467 A | * | 11/1964 | Daigh et al. | 123/574 |
| 3,177,858 A | * | 4/1965 | Vanderpoel | 123/572 |
| 3,202,145 A | * | 8/1965 | De Paolo | 123/574 |
| 3,237,616 A | * | 3/1966 | Daigh et al. | 123/574 |
| 3,495,578 A | * | 2/1970 | Guarnaschelli | 123/574 |
| 3,724,503 A | * | 4/1973 | Cooke | 138/45 |
| 4,557,226 A | | 12/1985 | Mayer et al. | |
| 5,140,968 A | | 8/1992 | Doan | |
| 5,291,916 A | | 3/1994 | Kloosterman et al. | |
| 5,499,616 A | | 3/1996 | Enright | |
| 5,722,376 A | | 3/1998 | Sweeten | |
| 6,575,022 B1 | * | 6/2003 | Schneider et al. | 73/114.01 |
| 7,431,023 B2 | | 10/2008 | Kavanagh et al. | |
| 7,900,612 B2 | * | 3/2011 | Knaus et al. | 123/574 |
| 8,813,731 B2 | * | 8/2014 | Hattori et al. | 123/572 |
| 2006/0016477 A1 | | 1/2006 | Zaparackas | |

(Continued)

FOREIGN PATENT DOCUMENTS

WO    2009116063 A2    9/2009

OTHER PUBLICATIONS

Pursifull, Ross Dykstra, "Method for Determining Crankcase Breach and Oil Level," U.S. Appl. No. 13/451,314, filed Apr. 19, 2012, 25 pages.

(Continued)

*Primary Examiner* — Hung Q Nguyen
(74) *Attorney, Agent, or Firm* — Julia Voutyras; Alleman Hall McCoy Russell & Tuttle LLP

(57) ABSTRACT

Methods and systems are provided for flowing crankcase gases through an aspirator arranged in a PCV line. The aspirator regulates PCV flow, and may also generate vacuum depending on a position of a pintle extendable across a horizontal passage of the aspirator. When regulating PCV flow and not generating vacuum, the aspirator is fully closed and crankcase gases in the horizontal passage are metered through an orifice in the pintle. When generating vacuum, the aspirator is at least partially opened and PCV flow through the horizontal passage generates vacuum at a vacuum port of the aspirator.

20 Claims, 9 Drawing Sheets

(56) References Cited

U.S. PATENT DOCUMENTS

| | | |
|---|---|---|
| 2008/0103667 A1 | 5/2008 | Suzuki et al. |
| 2010/0089345 A1 | 4/2010 | Kim et al. |
| 2010/0139585 A1 | 6/2010 | Frazier, Jr. |
| 2010/0147270 A1 | 6/2010 | Pursifull et al. |
| 2010/0180872 A1 | 7/2010 | Monros |
| 2011/0132311 A1 | 6/2011 | Pursifull et al. |
| 2011/0146631 A1 | 6/2011 | Konohara et al. |

OTHER PUBLICATIONS

Pursifull, Ross Dykstra et al., "Crankcase Integrity Breach Detection," U.S. Appl. No. 13/618,884, filed Sep. 14, 2012, 21 pages.

* cited by examiner

US 9,097,149 B2

ASPIRATOR FOR CRANKCASE VENTILATION AND VACUUM GENERATION

TECHNICAL FIELD

This application relates to an aspirator for regulating a flow of crankcase gases into an engine intake manifold. The aspirator performs the function of a positive crankcase ventilation valve, while additionally serving as a source of vacuum under some conditions.

BACKGROUND AND SUMMARY

Unburned fuel and other combustion products may escape past the piston of an internal combustion engine (e.g., an internal combustion engine of a vehicle) into the crankcase. The resulting gases in the crankcase, often referred to as "blowby" gases, may contribute to the formation of sludge in the engine oil supply. Further, blowby gases may excessively pressurize the crankcase, resulting in undesirable leakage of oil pan gasket and crankcase seals.

To avoid these issues, an engine may include a positive crankcase ventilation (PCV) system coupled to the intake, which serves to vent blowby gases from the crankcase to the intake. The PCV system may include a PCV valve intermediate the crankcase and the engine intake passage, to regulate the flow of blowby gases from the crankcase to the intake manifold. Such regulation may be needed because intake manifold vacuum characteristics may not match flow requirements for proper crankcase ventilation. For example, whereas blowby production may be greatest during high load engine conditions and very light during idle and light load engine conditions, intake manifold vacuum may be low during the high load conditions and high during the idle and light load engine conditions. Thus, intake manifold vacuum alone may not provide enough crankcase ventilation during high load conditions, yet too much crankcase ventilation may occur during idle and low load conditions due to the high intake manifold vacuum present in these conditions. Further, regulation of blowby gas flow in a PCV line ("PCV flow") may be needed to ensure the air-fuel ratio in the intake manifold enables efficient engine operation. For example, if PCV flow does not vary in proportion to the regular air-fuel ratio being drawn into the intake manifold, the PCV flow may cause the air-fuel mixture drawn into the intake manifold to become too lean for efficient engine operation.

Various types of PCV valves may be used in engine PCV systems to regulate PCV flow. A typical crankcase vent valve restricts flow with a small orifice when a deep intake manifold vacuum exists, and is much less restrictive to flow (large orifice) when a shallow intake manifold vacuum exists. One standard PCV valve configuration includes a substantially conic member arranged within a valve housing, where the cone is oriented within the housing such that its tapered end faces the end of the valve housing which communicates with the intake manifold. When there is no vacuum in the intake manifold, for example during engine off conditions, a spring keeps the base of the cone seated against the end of the valve housing which communicates with the crankcase, such that the PCV valve is fully closed. Although the PCV valve is fully closed, an orifice running through the length of the cone allows a fixed amount of PCV flow to be metered through the PCV valve. In contrast, when there is a high level of vacuum in the intake manifold, for example under engine idle or deceleration conditions, the cone moves upward within the valve housing towards the intake manifold end of the valve housing due to the slight increase in intake manifold vacuum. At this time, the PCV valve is substantially closed, and PCV flow moves through a small annular opening between the cone and the valve housing. Because only minimal blowby gases may be present during engine idle or deceleration conditions, the small annular opening may be adequate for crankcase ventilation. When intake manifold vacuum is at a lower level, for example during part-throttle operation, the cone moves closer to the crankcase end of the valve housing, and PCV flow moves through a larger annular opening between the cone and the valve housing. At this time, the PCV valve is partially open. During part-throttle operation, there may be an increased amount of blowby gases present relative to engine idle or deceleration conditions, and thus the larger annular opening may be appropriate for crankcase ventilation. Finally, a further decrease in intake manifold vacuum (while intake manifold vacuum is still greater than zero), for example during high load conditions, moves the cone even closer to the crankcase end of the valve housing, and PCV flow moves through an even larger annular opening between the cone and the valve housing. At this time, the PCV valve is considered to be fully open, such that PCV flow through the valve is maximized. The fully open state of the PCV valve is well-suited to high load conditions, since during these conditions there may be an increased amount of blowby gases. In this way, the opening state of the PCV valve is influenced by manifold vacuum, and the flow rate of the PCV valve is proportionate to manifold vacuum. The minimum flow rate of the PCV valve is determined by the dimensions of the orifice in the conic member, as PCV flow is metered through the orifice when the PCV valve is in the fully closed position. During conditions where intake manifold pressure exceeds crankcase pressure, PCV flow may move through the valve backwards (as "PCV backflow"), towards the crankcase. PCV systems may or may not be configured to prevent such operation, as the minimal amount of PCV backflow through the orifice in the cone may or may not pose problems for engine operation.

In addition to a PCV valve, an aspirator may be included in a PCV line to generate vacuum via PCV flow. Using crankcase gases as the motive flow for an aspirator may be advantageous in that it avoids the problem of saturating engine throttle control during warm idle conditions with low front end accessory drive loads. One example approach for directing a motive flow of crankcase gases through an aspirator to generate vacuum is shown in US 2011/0132311. In one embodiment, a PCV system is in communication with an intake manifold via an aspirator. An entraining inlet of the aspirator is in communication with a vacuum reservoir. Further, a passive control valve is arranged intermediate the PCV system and the intake manifold to limit communication from the intake manifold to the PCV system. The passive control valve is described as a having a similar flow characteristic to a PCV valve. Crankcase gases vented to the intake manifold first flow through the passive control valve, then through a motive inlet of the aspirator (drawing air from the entraining inlet), and finally leave the aspirator via an outlet. In this way, air and crankcase gases may be used to generate vacuum during positive crankcase ventilation.

The inventors herein have recognized that both vacuum generation and PCV flow regulation may be accomplished via a single component. In one example, the inventors herein have conceived of an aspirator that functions as both a PCV valve and a source of vacuum when configured in the PCV system described herein. A PCV system equipped with such an aspirator may advantageously accomplish vacuum generation and PCV flow regulation by way of a single component. Use of this multi-functioning aspirator may reduce manufacturing and installation costs and simplify control of the PCV system, while also achieving the advantages associated with the use of blowby gases for vacuum generation. Further, as this aspirator may be the only PCV valve in the system in some examples, PCV flow energy that would otherwise be expended across a PCV valve orifice may be harnessed for vacuum generation under some conditions.

One example method for an engine equipped with such an aspirator includes, in a first operating mode, at least partially opening an aspirator and flowing crankcase gases through the aspirator. The method further includes, in a second operating mode, fully closing the aspirator and metering crankcase gases through an orifice of a pintle of the aspirator. In this way, an aspirator may be controlled so as to provide appropriate PCV flow regulation and vacuum generation for a current operating mode. Via the novel inclusion of an orifice in a pintle of the aspirator, the aspirator may function as a fully closed PCV valve under some conditions, whereas under other conditions the aspirator may function as a substantially closed, partially open, or fully open PCV value while simultaneously generating vacuum via the flow of crankcase gases through the aspirator. The vacuum generated by the aspirator may advantageously be used for actuation, enabling vehicle brakes, purging a fuel canister, improving an engine start, performing a leak test, etc.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for using an aspirator (e.g., the aspirator of FIG. 2 or FIG. 5) for both crankcase ventilation and vacuum generation. The aspirator may function as a PCV valve, and PCV flow through the aspirator may generate vacuum depending on a position of a pintle of the aspirator, the pintle including an orifice through which PCV flow is metered when the aspirator is fully closed. An engine controller may be structured to perform control routines, such as the methods of FIGS. 6-8, to select an aspirator operating mode and to control an actuator to move the pintle into a position corresponding to the selected operating mode and a current vacuum state, current vacuum requests, and engine constraints on aspirator flow rate. In this way, an aspirator in a PCV line coupling the crankcase and intake of an engine may serve as a PCV valve, thus reducing the need for any other means of PCV flow regulation to be included in the PCV system, while also serving as a means for vacuum generation during some conditions. Further, a position of the aspirator pintle may be controlled via an electric solenoid actuator or a vacuum actuator to achieve a desired aspirator state, where the aspirator meters crankcase gases through an orifice in the pintle during a fully closed state, and where the aspirator generates variable amounts of vacuum at variable rates during various non-fully-closed states (e.g., partially open, fully open, or substantially closed). For example, when the aspirator is a vacuum source, the amount of vacuum generated may vary with a degree of extension of the pintle across a horizontal passage of the aspirator. Alternatively, the pintle may comprise a stack of switchable throats, each throat having different vacuum generation and flow rate characteristics.

Figure 1:
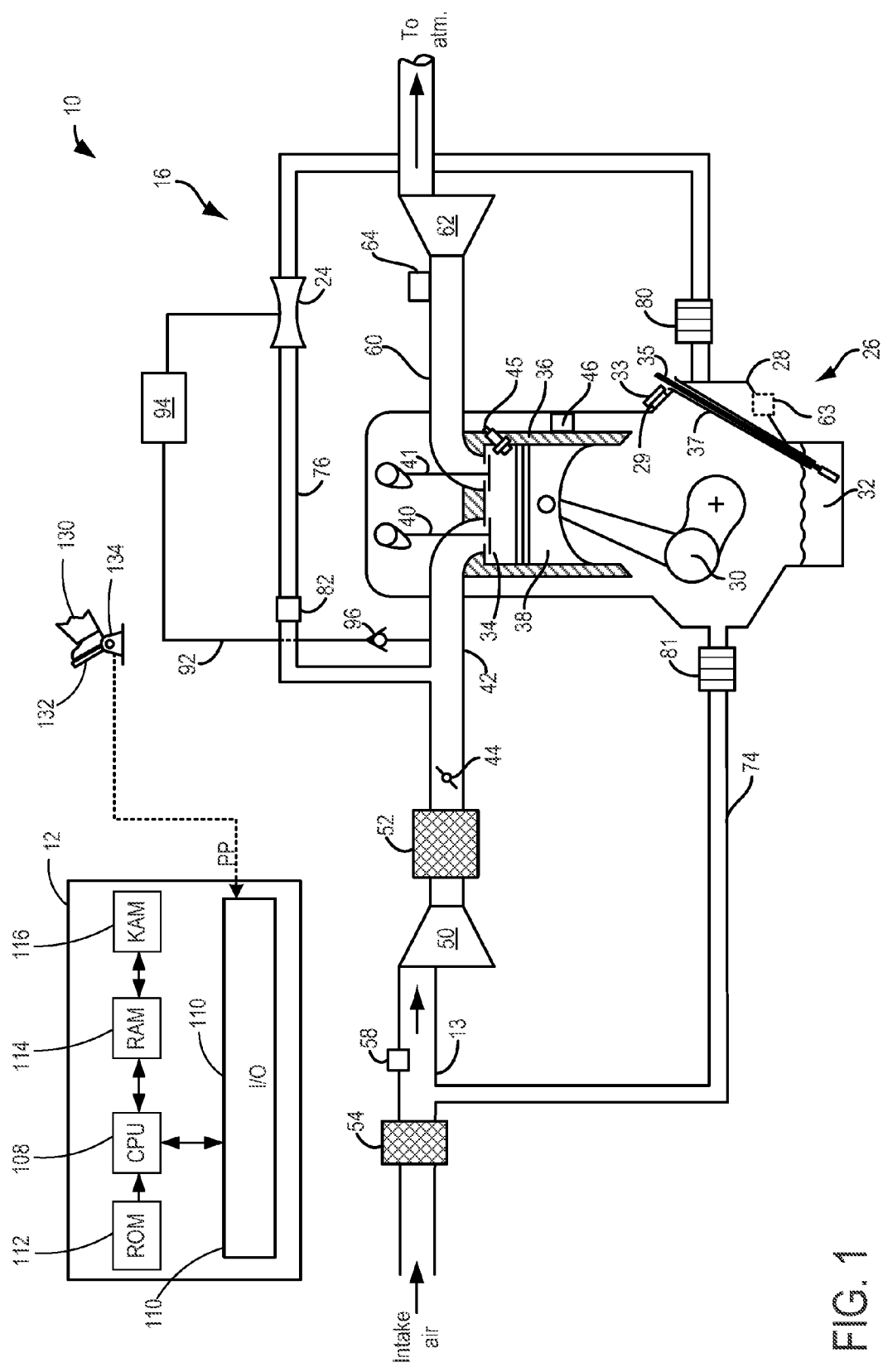
FIG. 1 shows an engine system including an aspirator coupling a positive crankcase ventilation system with an engine intake.

Referring now to FIG. 1, it shows an example system configuration of a multi-cylinder internal combustion engine, generally depicted at 10, which may be included in a propulsion system of an automotive vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 56. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or vent tube 74. Crankcase ventilation tube 74 may be coupled to fresh air intake passage 13 upstream of compressor 50. In some examples, the crankcase ventilation tube may be coupled downstream of air cleaner 54 (as shown). In other examples, the crankcase ventilation tube may be coupled to intake passage 13 upstream of air cleaner 54.

PCV system 16 also vents gases out of the crankcase and into intake manifold 42 via a conduit 76 (herein also referred to as PCV line 76). It will be appreciated that, as used herein, PCV flow refers to the flow of gases through conduit 76 from the crankcase to the intake manifold. Similarly, as used herein, PCV backflow refers to the flow of gases through conduit 76 from the intake manifold to the crankcase. PCV backflow may occur when intake manifold pressure is higher than crankcase pressure. In some examples, PCV system 16 may be equipped with means for preventing PCV backflow. In other examples, the occurrence of PCV backflow may be inconsequential, or even desirable; in these examples, PCV system 16 may exclude means for preventing PCV backflow, or may advantageously use PCV backflow for vacuum generation, for example.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 42. Another oil separator 81 may be disposed in conduit 74 to remove oil from the stream of gases exiting the crankcases during boosted operation. Additionally, PCV line 76 may also include a vacuum sensor 82 coupled to the PCV system.

Crankcase ventilation system 16 may include one or more vacuum-generating devices, such as one or more aspirators, ejectors, and/or venturis, for harnessing the flow of crankcase ventilation vapors and using it to generate vacuum. For example, PCV system 16 may include an aspirator 24 in conduit 76. Example embodiments of aspirator 24 are described in further detail with respect to FIGS. 2-5.

Aspirator 24 regulates PCV flow. More specifically, aspirator 24 functions as a PCV valve and thereby reduces the need for any actual PCV valves to be included in PCV line 76. As described above, PCV flow regulation may be needed to ensure that flow requirements for proper crankcase ventilation are achieved, and to ensure that the air-fuel ratio in the intake manifold enables efficient engine operation. While aspirator 24 may be the only PCV valve in PCV line 76, and thus only the aspirator may regulate PCV flow in the system, it will be appreciated that one or more actual PCV valves may also be included in PCV line 76, along with aspirator 24, without departing from the scope of the present disclosure.

Under some conditions, in addition to regulating PCV flow, aspirator 24 generates vacuum. A vacuum port of aspirator 24 may be coupled to a vacuum reservoir 94 for storing the generated vacuum. The stored vacuum may then be used for actuating various engine vacuum actuators. These may include, for example, vehicle brake boosters, fuel vapor purge control systems, etc. In alternative embodiments, the vacuum generated at the aspirator may be directly applied to the vacuum actuators. Further, the stored vacuum may be used for various other purposes such as engine starting, crankcase leak testing, etc.

As shown in FIG. 1, vacuum reservoir 94 may also be coupled with intake manifold 42 via a plumbing path 92. Plumbing path 92 includes a check valve 96 which prevents backflow from the vacuum reservoir to the intake manifold. Inclusion of plumbing path 92 in the system enables the vacuum reservoir 94 (or a vacuum consumer) to use the best available source of vacuum: the vacuum generated by aspirator 24, or the intake manifold vacuum.

An operating mode of aspirator 24 may be selected by controller 12. Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; etc. Furthermore, controller 12 may monitor and adjust the position of various actuators based on input received from the various sensors. These actuators may include, for example, throttle 44, intake and exhaust valve systems 40, 41, and electric solenoid 212 which will be described below with reference to FIG. 2. Storage medium read-only memory 112 can be programmed with computer readable data representing instructions executable by processor 108 for performing the methods described below, as well as other variants that are anticipated but not specifically listed. Example methods and routines are described herein with reference to FIGS. 6-8. For example, FIGS. 7A-7B depict example methods for selecting an aspirator operating mode.

In this way, the system of FIG. 1 enables the use of an aspirator arranged in a conduit connecting an engine crankcase with an engine intake as the only PCV valve included in the system, and further as a source of vacuum under some conditions. Specifically, depending on engine operating conditions such as vacuum state, vacuum requests, and PCV flow rate constraints, an aspirator operating mode may be selected (e.g., between a mode where the aspirator regulates PCV flow but does not generate vacuum and a mode where the aspirator regulates PCV flow while also generating vacuum).

Figure 2:
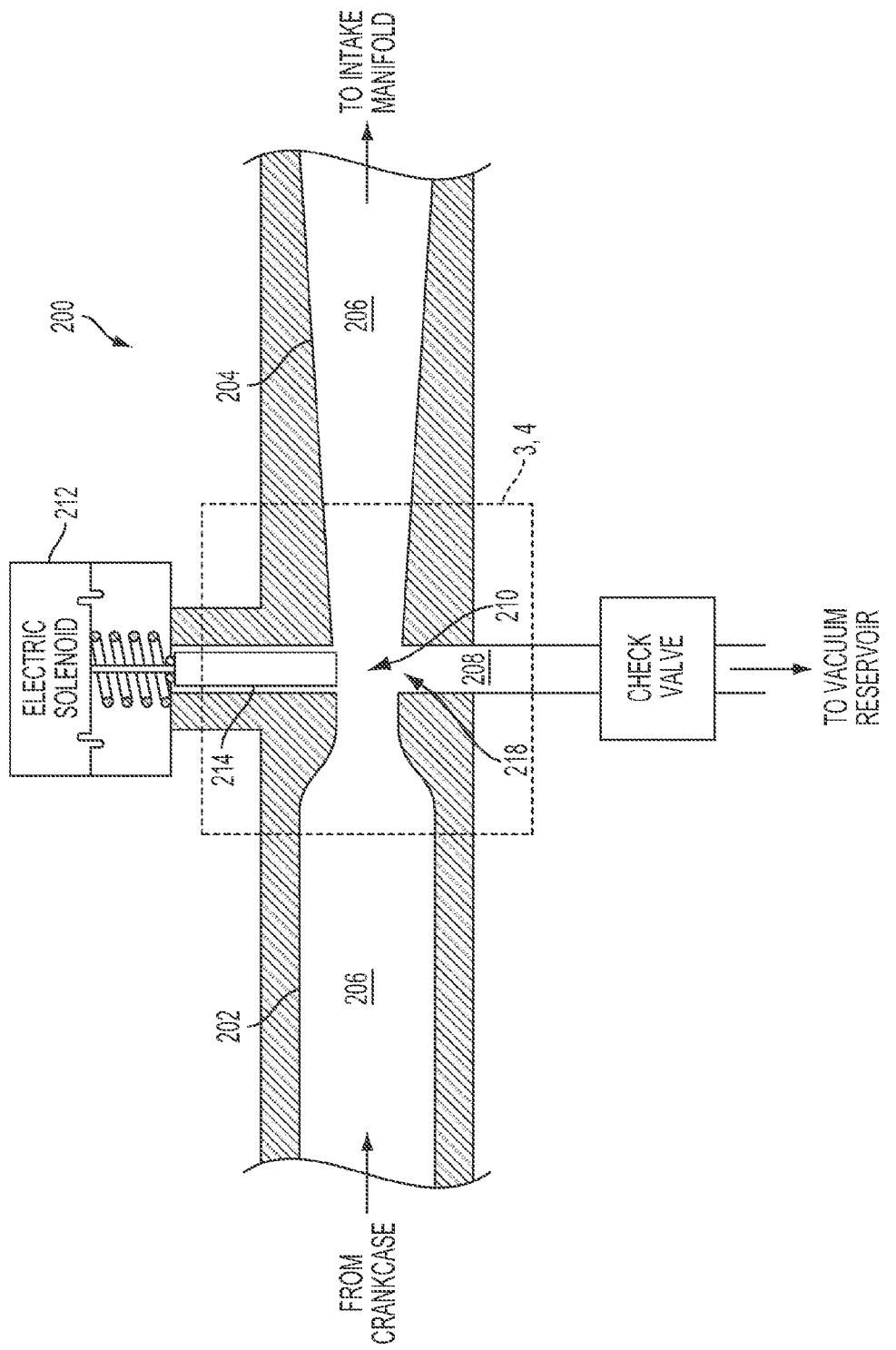
FIG. 2 is a sectional view of a first example embodiment of the aspirator of FIG. 1, including an electric solenoid actuator.

FIG. 2 is a sectional view of aspirator 200, which is a first example embodiment of aspirator 24 of FIG. 1. Aspirator 200 includes a horizontal passage 206 with a converging inlet 202 coupled to crankcase 28 via conduit 76 and a diverging outlet 204 coupled to intake manifold 42 via conduit 76. Outlet 204 may be a gradually diverging conic section. In one example, outlet 204 may diverge at an angle of 8° plus/minus 2°. Aspirator 200 further includes a vertical passage 208 extending through the horizontal passage at a juncture 210 of the inlet and the outlet (which may alternatively be referred to as a gap between the inlet and the outlet). A diameter of inlet 202 at juncture 210 may be slightly smaller than a diameter of outlet 204 at juncture 210. In one example, the diameter of the inlet at the juncture may be 4.0 mm, and the diameter of the outlet at the juncture may be 4.5 mm, plus/minus 1 mm. An actuator 212 coupled to vertical passage 208 controls a position of a pintle 214 which is vertically extendable/retractable in the vertical passage. Vertical passage 208 is coupled to vacuum reservoir 94 via a check valve 216. The region of vertical passage 208 adjacent to juncture 210 on the vacuum reservoir side of horizontal passage 206 will be referred to as vacuum port 218. While not depicted, seals may be included in vertical passage 208 immediately above and below juncture 210 to prevent leakage of PCV flow into vacuum reservoir 94 when the aspirator is fully closed, and to prevent leakage of PCV flow into the vertical passage above the juncture.

In the embodiment of FIG. 2, actuator 212 is an electric solenoid. However, it will be appreciated that other types of actuators may be used rather than an electric solenoid. For example, in the second example embodiment of aspirator 24 depicted in FIG. 5, a vacuum actuator controls the pintle.

A flow characteristic and an amount of vacuum generated by aspirator 200 may vary with a degree of extension of pintle 214 across juncture 210 of horizontal passage 206. For example, a cross-sectional flow area of horizontal passage 206 at juncture 210 may determine a PCV flow rate through the aspirator as well a rate of vacuum generation through the aspirator. The ability of an aspirator/ejector to "pump", that is to pull a vacuum flow, depends on several factors. The velocity of the gases and the downstream pressure determine the maximum vacuum level. The flow rate of the gases influences the ability to support a flow rate at a given vacuum. Of course, the geometry of the converging cone, gap, and diverging cone influence the effectiveness of the aspirator. Generally, the geometry is designed such that the aspirator generates a useful vacuum-flow rate curve when the aperture is fully open. When the aperture is partially closed, the "vacuum pump" effectiveness is reduced, but the flow is restricted. In this position, the intake manifold itself has ample vacuum and the vacuum-enhancing effect of the aspirator is not needed. Thus, the aspirator enhances vacuum when intake manifold vacuum is low, and restricts flow when intake manifold vacuum is high. This characteristic corresponds to the needs of the crankcase ventilation system.

As will be described below, due to the Venturi effect, a smaller flow area at the juncture will increase the speed of PCV flow at the juncture and decrease the pressure of the PCV flow through the juncture, thereby maximizing vacuum generation. However, the narrowing of the flow area will decrease the overall flow rate of PCV gases through the aspirator. Accordingly, a narrower flow area at juncture 210 may be appropriate during conditions where maximizing vacuum generation is more important than maximizing PCV flow rate. On the other hand, a larger flow area at the juncture will decrease the speed of PCV flow at the juncture and thus less vacuum generation will occur. However, the larger flow area will result in an increased overall flow rate of PCV gases through the aspirator, which may be appropriate during conditions where maximizing PCV flow rate is more important than maximizing vacuum generation. In addition to aiming to maximize vacuum generation or PCV flow rate, it will be appreciated that the controller may determine an appropriate flow area at the juncture to achieve a compromise between vacuum generation and PCV flow rate, and/or to achieve a PCV flow rate corresponding to a desired intake air-fuel ratio, for example.

FIG. 2 depicts aspirator 200 in a fully open configuration, where pintle 214 is fully retracted (i.e., not extended at all) such that it does not impinge upon horizontal passage 206. In this configuration, the cross-sectional flow area at juncture 210 is at a maximum. The aspirator may be controlled to be fully opened in this way during conditions where flow rate takes priority over vacuum generation, for example during high load conditions where an increased amount of blowby gases flow in the PCV line. However, even when the aspirator is fully opened, some vacuum may be generated at vacuum port 218 due to the converging-diverging shape of horizontal passage 206.

Figure 3B:
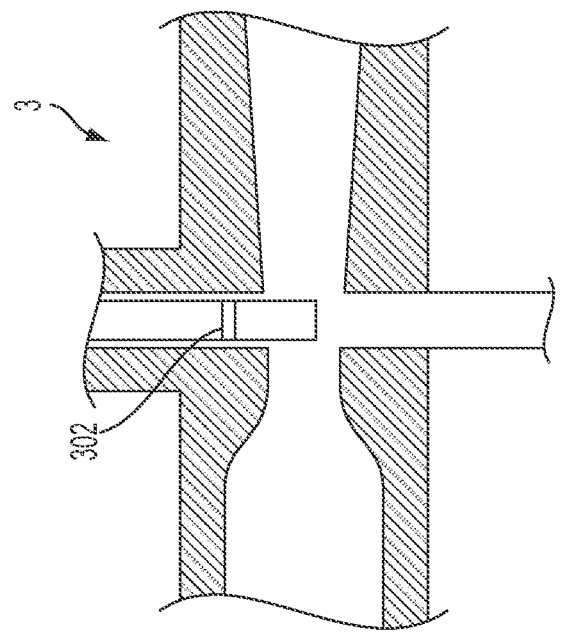
FIGS. 3A-3C are sectional views of a detail of a first embodiment of the aspirator of FIG. 2 with different pintle positions.
Figure 3A:
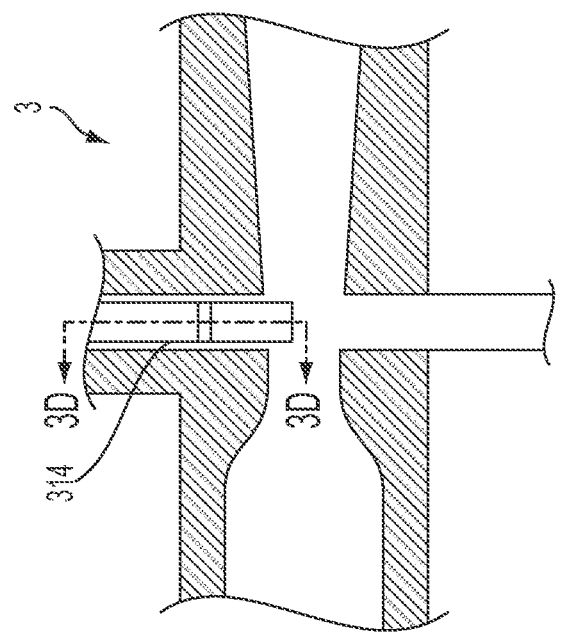
Figure 3D:
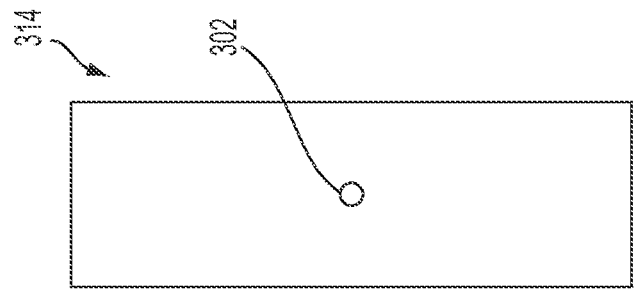
FIG. 3D is a view of the pintle of the aspirator embodiment of FIGS. 3A-3C along the plane D as indicated in FIG. 3A.
Figure 3C:
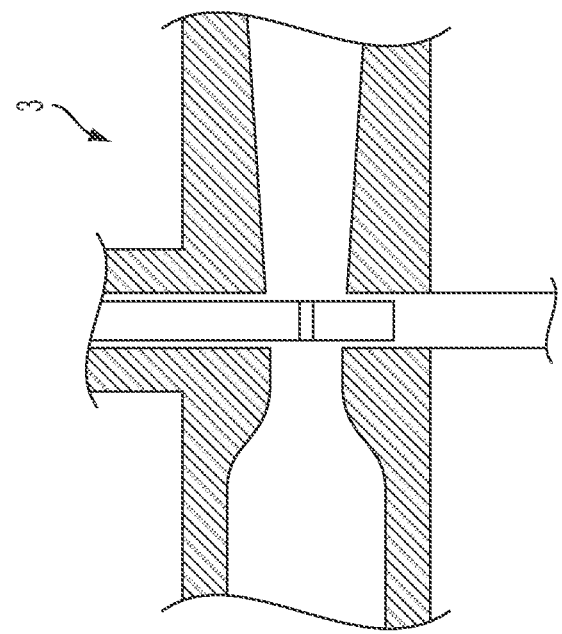
Figure 4B:
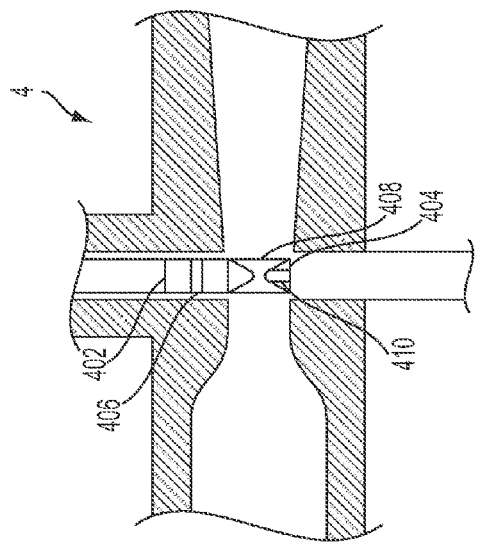
FIGS. 4A-4B are sectional views of a detail of a second embodiment of the aspirator of FIG. 2 with different pintle positions.
Figure 4C:
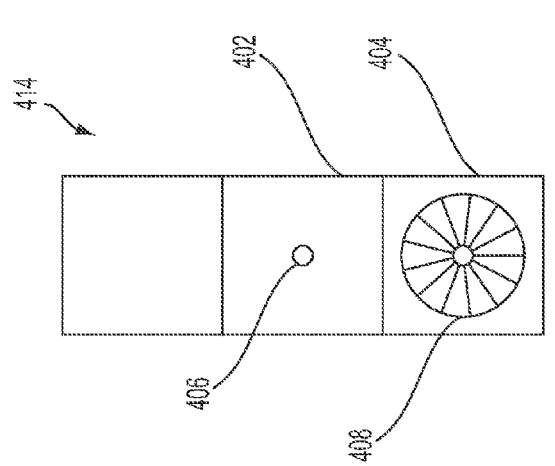
FIG. 4C is a view of the pintle of the aspirator embodiment of FIGS. 4A-4B along the plane C as indicated in FIG. 4A.
Figure 4A:
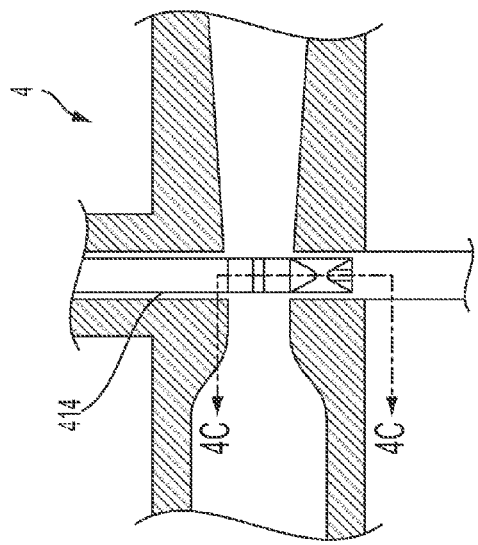

While pintle 214 is depicted as a solid rectangle in FIG. 2, the detail views of aspirator 200 in FIGS. 3A-3D illustrate a first example embodiment of detail 3 of aspirator 200 which includes a pintle 314 with an orifice, and the detail sectional views of aspirator 200 in FIGS. 4A-4C illustrate a second example embodiment of detail 4 of aspirator 200 which includes a pintle 414 comprising a stack of throats including an orifice throat. It will be appreciated that embodiments of pintle 214 other than pintles 314 and 414 which enable variance of a PCV flow characteristic and a vacuum generation characteristic via control of the degree of extension of the pintle remain within the scope of this disclosure; pintles 314 and 414 are merely exemplary embodiments of pintle 214. Alternatively, in addition to or instead of a pintle, the aspirator may have another aspect that is adjustable to vary the flow rate and vacuum generation rate.

In the first example embodiment depicted in FIGS. 3A-3D, pintle 314 includes an orifice 302. As shown in the example of FIG. 3D, which depicts a portion of pintle 314 corresponding to the view lines 3D indicated in FIG. 3A, fixed-size orifice 302 may be horizontally centered on pintle 314. Depending on the degree of extension of pintle 314 within vertical passage 208, orifice 302 may or may not be disposed in horizontal passage 206 at juncture 210. Further, a cross-sectional flow area of horizontal passage 206 at juncture 210 may vary depending on the degree of extension of pintle 314 within vertical passage 208. In this way, the cross-sectional flow area at the juncture may be varied in a continuous manner.

FIG. 3A depicts pintle 314 in a partially extended position, where the pintle extends across approximately one third of the height of horizontal passage 206 at juncture 210. In this configuration, aspirator 200 may be considered to be substantially open. Relative to the fully open configuration, aspirator 200 may generate more vacuum, but the flow rate of PCV gases through the aspirator may be lower. This configuration may be appropriate during part-throttle operation, when more blowby gases are present relative to engine idle or deceleration conditions, but less blowby gases are present relative to high load conditions.

FIG. 3B depicts pintle 314 in a substantially extended position, where the pintle extends across approximately two thirds of the height of horizontal passage 206 at juncture 210. In this configuration, aspirator 200 may be considered to be partially open. Relative to the substantially open configuration, aspirator 200 may generate more vacuum, but the flow rate of PCV gases through the aspirator may be lower. This configuration may be appropriate during engine idle or deceleration conditions, when only minimal blowby gases are present. Further, this configuration may be appropriate during engine operating conditions requiring ample vacuum, or when an amount of vacuum stored or available to various engine components and systems requiring vacuum falls below a threshold, for example.

FIG. 3C depicts pintle 314 in a fully extended position, where the pintle extends across the entire height of horizontal passage 206 at juncture 210. At this time, orifice 302 may be disposed in the horizontal passage, and the aspirator may be considered to be in a fully closed configuration. When the aspirator is in the fully closed configuration, the pintle is extended across juncture 210 such that a portion of the pintle is flush with the periphery of the vertical passage immediately below juncture 210. Seals (not shown) may be arranged in vertical passage 208 at the top and bottom of juncture 210 to prevent leakage of PCV flow around the pintle and into the vertical passage above and below the juncture. During PCV flow through orifice 302, aspirator 200 generates less vacuum relative to PCV flow during other pintle positions, or generates no vacuum (e.g., when seals are included to prevent PCV flow leakage).

A diameter of orifice 302 may be substantially smaller than a diameter of the horizontal passage at the juncture. In this way, even when the aspirator is closed, some flow may be metered through the aspirator via the orifice, such that the aspirator acts like a fully closed PCV valve. The flow amount/flow rate of PCV flow through the orifice may be a function of the diameter of the orifice. As such, it will be appreciated that in some embodiments, pintle 314 may include multiple orifices with varying diameters to provide more flexibility for PCV flow regulation. The fully closed aspirator configuration may be appropriate during conditions where vacuum generation is not required, and/or during conditions where leaning of the intake air-fuel ratio by the PCV flow must be minimized.

Alternatively, pintle 214 may comprise a stack of throats including a throat with an orifice. Such a pintle is depicted in the detail sectional views of aspirator 200 in FIGS. 4A-4C as pintle 414. In this example, pintle 414 may be extended in discrete increments so as to position one of the plurality of throats in the horizontal passage at the juncture. PCV flow and vacuum generation characteristics of the horizontal passage 206 at the juncture thus vary depending on the degree of extension of pintle 414 within vertical passage 208, as the degree of extension of the pintle determines which of the throats is currently arranged in the horizontal passage across the juncture.

FIG. 4C depicts a portion of pintle 414 corresponding to the view lines 4C indicated in FIG. 4A. In this example, pintle 414 includes an orifice throat 402 with a fixed-size orifice 406, and a converging-diverging throat 404 with a converging-diverging opening 408 and a vacuum tube 410. Converging-diverging throat 404 is arranged at a vacuum-port-side end of pintle 414, and orifice throat 402 is adjacent to converging-diverging throat 404 and closer to an actuator-side end of pintle 414, such that the two throats are "stacked" with the orifice throat on top of the converging-diverging throat. It will be appreciated that FIGS. 4A-4C depict just one of many possible stacked-throat configurations. For example, the pintle may include more than two stacked throats, with different flow characteristics. Further, the stacked throats may be spaced apart on the pintle rather than adjacent.

FIG. 4A depicts a configuration in which orifice throat 402 is positioned across juncture 210, such that PCV flow through the aspirator is metered through the orifice. At this time, the aspirator may be considered to be in a fully closed configuration. Seals (not shown) may be arranged in vertical passage 208 at the top and bottom of juncture 210 to prevent leakage of PCV flow around the pintle and into the vertical passage above and below the juncture.

A diameter of orifice 406 may be substantially smaller than a diameter of the horizontal passage at the juncture (e.g., the orifice may be more restrictive than the horizontal passage at the juncture with respect to PCV flow therethrough). In this way, even when the aspirator is closed, some flow may be metered through the aspirator via the orifice, such that the aspirator acts like a fully closed PCV valve. The flow amount/flow rate of PCV flow through the orifice may be a function of the diameter of the orifice. As such, it will be appreciated that in some embodiments, pintle 414 may include multiple orifice throats with orifices of varying diameters to provide more flexibility for PCV flow regulation. As discussed above with respect to FIG. 3C, the fully closed aspirator configuration may be appropriate during conditions where vacuum generation is not required, and/or during conditions where leaning of the intake air-fuel ratio by the PCV flow must be minimized.

FIG. 4B depicts a configuration in which converging-diverging throat 404 is positioned across juncture 210. Seals (not shown) may be arranged in vertical passage 208 at the top and bottom of juncture 210 to prevent leakage of PCV flow around the pintle and into the vertical passage above and below the juncture. When converging-diverging throat 404 is positioned across juncture 210, converging-diverging opening 408 communicates with vertical passage 208 at vacuum port 218 via vacuum tube 410.

In this configuration, aspirator 200 may be considered to be partially or substantially open, depending on the geometry of converging-diverging opening 408. Relative to the fully open configuration shown in FIG. 2, aspirator 200 may generate more vacuum, but the flow rate of PCV gases through the aspirator may be lower. This configuration may be appropriate during part-throttle operation, engine idle, or deceleration conditions when small to moderate amounts of blowby gases are present in the crankcase. Further, this configuration may be appropriate during engine operating conditions requiring some degree of vacuum boost. The geometry of converging-diverging opening 408 may be designed to provide a compromise between vacuum boost and PCV flow rate based on various engine parameters. Alternatively, pintle 414 may include multiple converging-diverging throats in its stack, each with a different converging-diverging opening corresponding to a particular PCV flow rate and vacuum generation rate.

Figure 5:
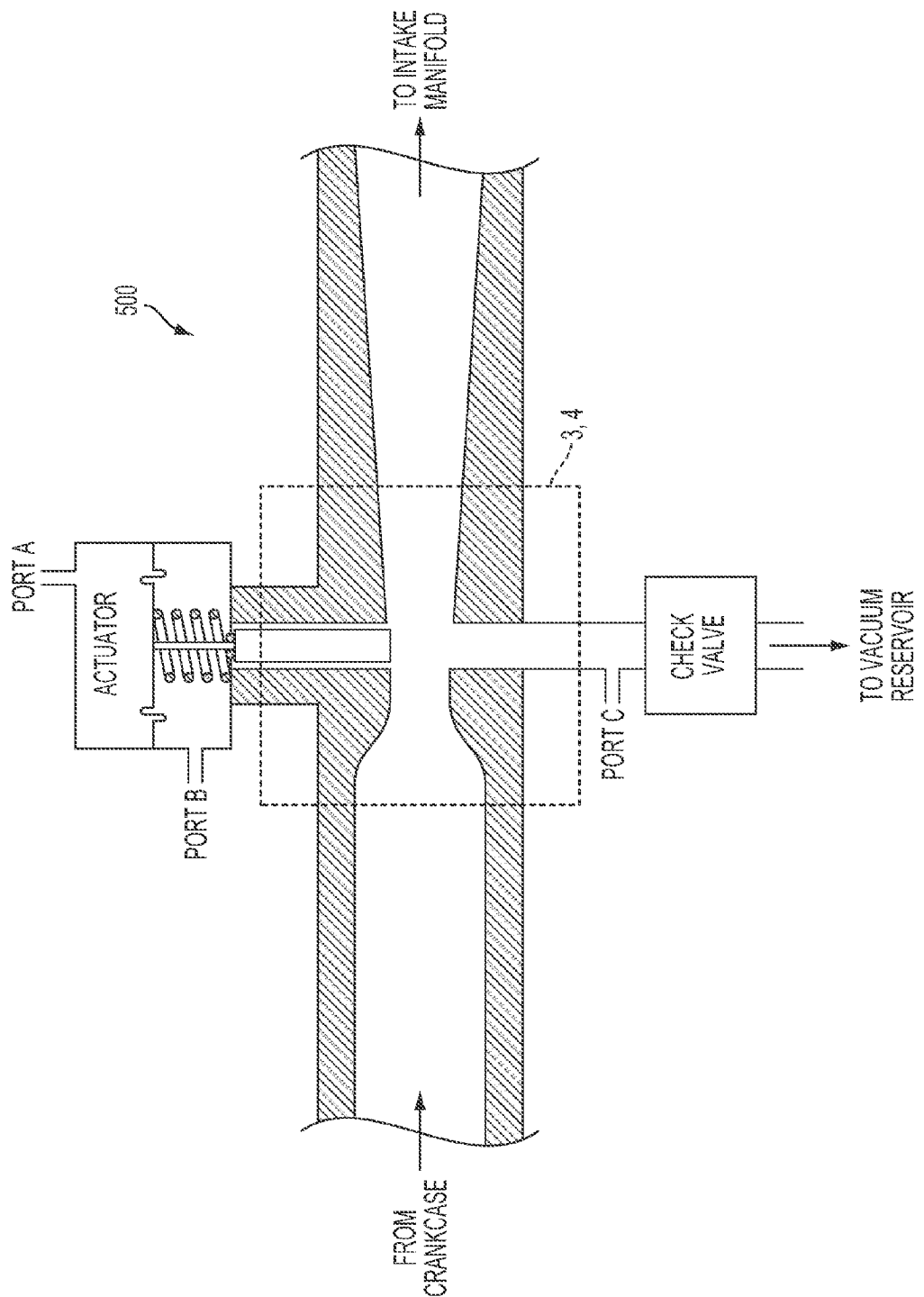
FIG. 5 is a sectional view of a second example embodiment of the aspirator of FIG. 1, including a vacuum actuator.

FIG. 5 is a sectional view of a second example embodiment of aspirator 500. This embodiment is identical to the first example embodiment of aspirator 24 (i.e., aspirator 200 shown in FIG. 2), except that a vacuum actuator 512 is coupled to vertical passage 208 to controls a position of a pintle 214, rather than an electric solenoid. Aspirator 500 may be substituted for aspirator 200 in either of the pintle embodiments shown in FIGS. 3A-3D and FIGS. 4A-4C.

Further, the aspirator of FIG. 5 includes three vacuum ports. As shown in FIG. 5, Port A is arranged at a top of the actuator, and Port B is arranged on a crankcase side of the actuator. Port C is arranged at vertical passage 208 intermediate the check valve and the vacuum port. These ports may be controlled to communicate with various engine systems/components such that pintle movement is induced by pressure differentials between the ports. In this way, controller 12 may select a connection scheme for the ports which will achieve a desired pintle behavior. The connection scheme may be selected based on the configuration of the pintle, for example.

In one example connection scheme, Port A communicates with atmosphere, Port B communicates with a vacuum source (e.g., a vacuum reservoir or a brake booster), and Port C is plugged. In accordance with this connection scheme, when vacuum at the vacuum source is high, the pintle is retracted. The pintle may be designed such that PCV flow is metered through an orifice at this time. In contrast, when vacuum at the vacuum source is low, the pintle is extended. The pintle may be designed such that PCV flow moves through a converging-diverging opening when the pintle is extended, to generate vacuum. For example, the pintle may include a converging-diverging throat stacked on top of an orifice throat, and seals may be omitted at the periphery of the vertical passage below the juncture such that PCV flow may travel into the vertical passage below the juncture when the converging-diverging throat is arranged in the horizontal passage. This results in a pneumatic-mechanical control system that produces vacuum on demand from the vacuum user.

In another example connection scheme, Port A communicates with atmosphere, Port B communicates with the intake manifold, and Port C is plugged. In accordance with this connection scheme, when vacuum at the intake manifold is high, the pintle is retracted. The pintle may be designed such that PCV flow is metered through an orifice at this time. In contrast, when vacuum at the intake manifold is low, the pintle is extended. The pintle may be designed such that PCV flow moves through a converging-diverging opening when the pintle is extended, to generate vacuum. This arrangement yields a pneumatic-mechanical control system that works much like a classic PCV valve but with far more predictable and tunable behavior.

In yet another example connection scheme, Port A communicates with the intake manifold, Port B communicates with a vacuum source (e.g., a brake booster), and Port C is plugged. In accordance with this connection scheme, when vacuum at the intake manifold is less than vacuum at the vacuum source, the pintle is retracted. The pintle may be designed such that PCV flow is metered through an orifice at this time. In contrast, when vacuum at the intake manifold is greater than vacuum at the vacuum source, the pintle is extended. The pintle may be designed such that PCV flow moves through a converging-diverging opening when the pintle is extended, to generate vacuum.

Figure 6:
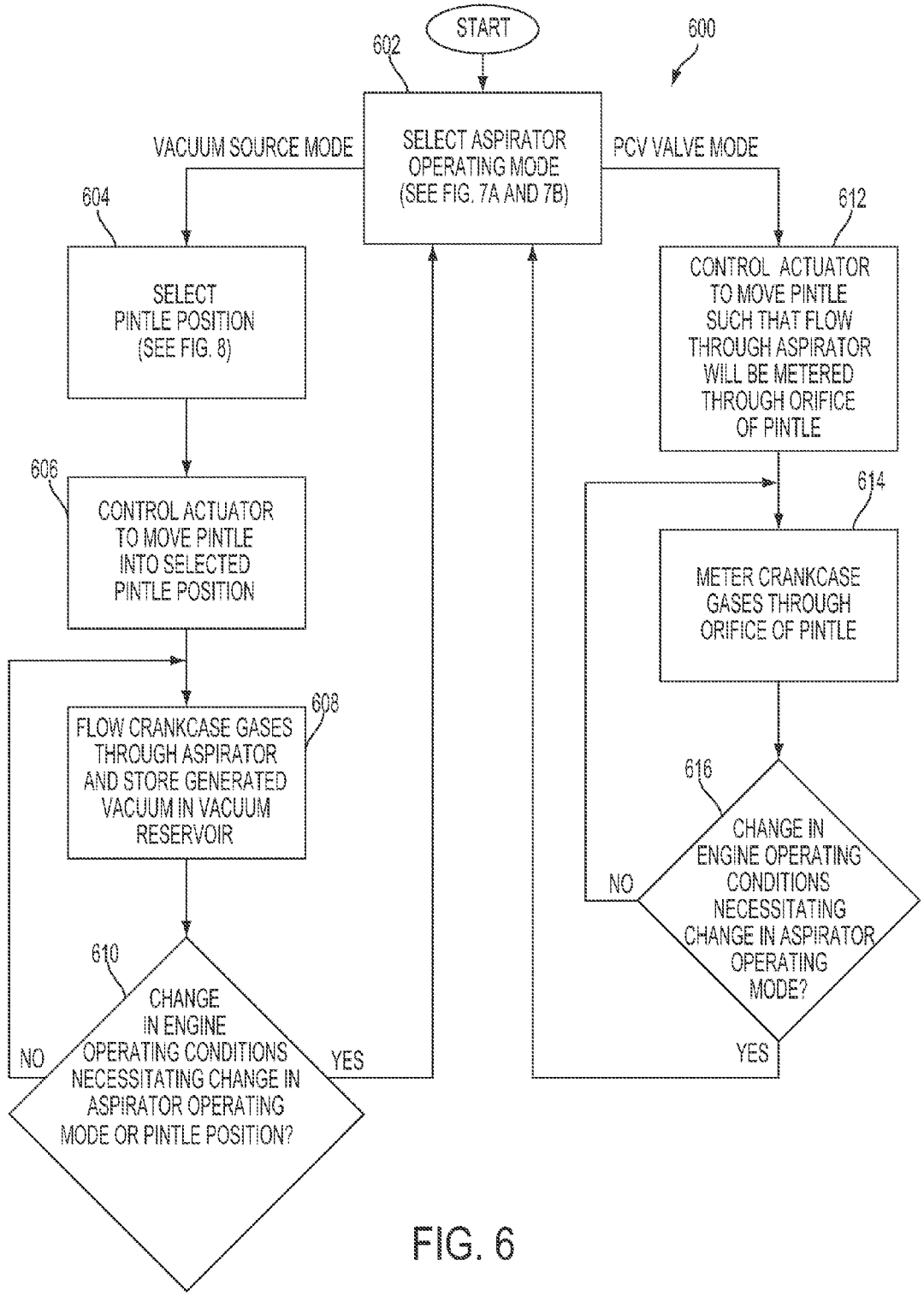
FIG. 6 is an example method for operating the aspirator of FIG. 1.
Figure 7A:
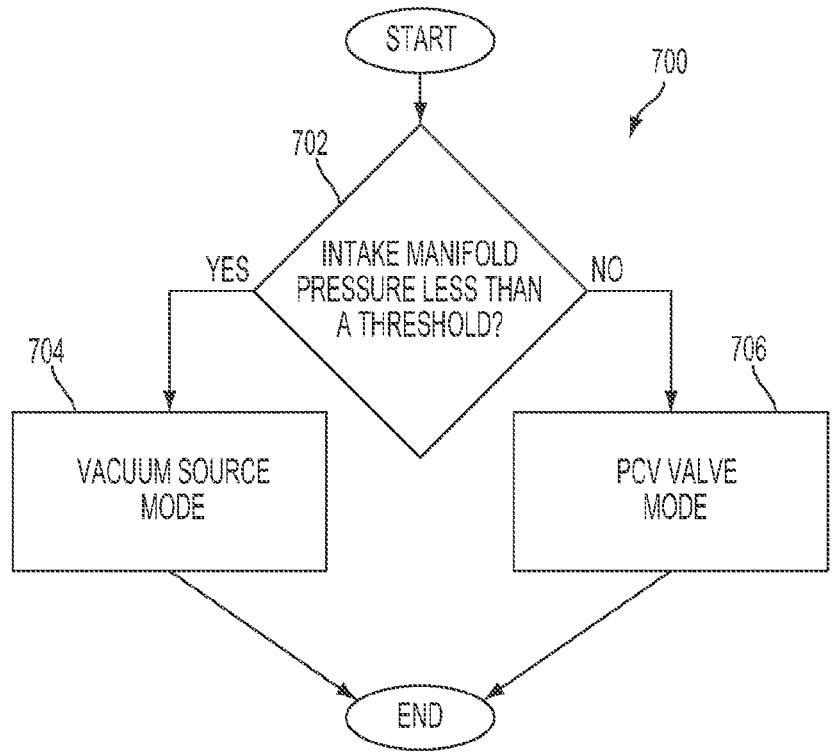
FIG. 7A is a first example method for selecting an aspirator operating mode, to be used in conjunction with the method of FIG. 6.
Figure 7B:
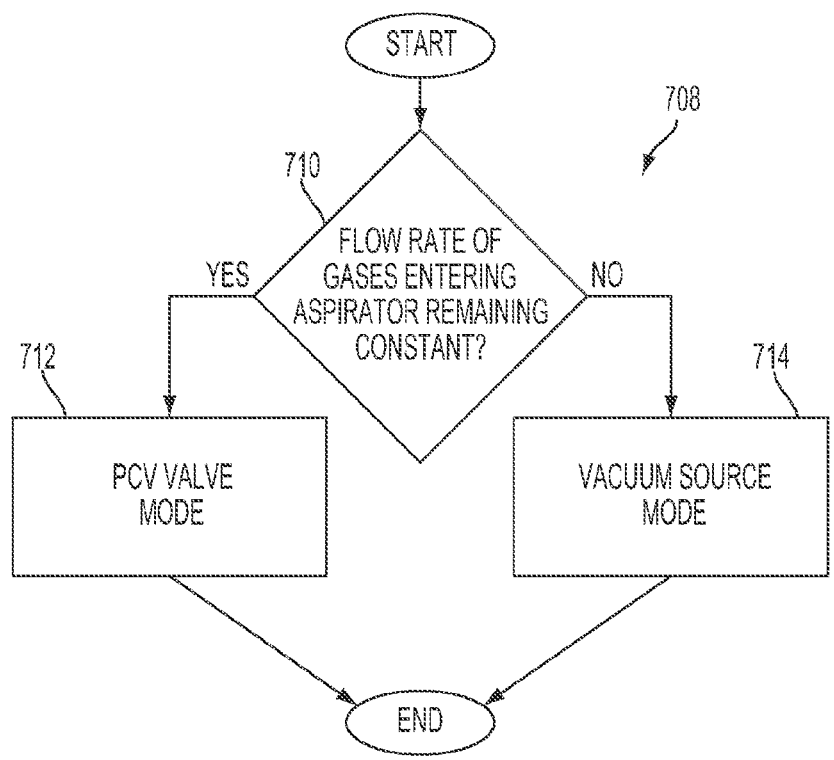
FIG. 7B is a second example method for selecting an aspirator operating mode, to be used in conjunction with the method of FIG. 6.

Now turning to FIG. 6, an example method 600 is shown for operating an aspirator. The aspirator may be electrically actuated, like aspirator 200 depicted in FIG. 2, or may be vacuum actuated, like aspirator 500 depicted in FIG. 5. The aspirator may include a pintle with an orifice, such as the pintle depicted in FIGS. 3A-3D. Alternatively, the pintle may comprise a stack of throats including a throat with an orifice, such as the pintle depicted in FIGS. 4A-4C. A position of the pintle may determine whether the aspirator generates vacuum in addition to regulating PCV flow. If the aspirator is generating vacuum, the position of the pintle may further determine an amount of vacuum generated by the PCV valve and a PCV flow rate through the aspirator.

At 602, an aspirator operating mode may be selected. As detailed below, example methods for selecting an aspirator operating mode are provided in FIGS. 7A and 7B. For example, as shown in FIG. 7A, an aspirator operating mode may be selected in accordance with method 700, based on whether intake manifold pressure is less than a threshold. In another example, as shown in FIG. 7B, an aspirator operating mode may be selected in accordance with method 708, based on whether a flow rate of gases entering the aspirator is a constant flow rate. Alternatively, any suitable method for selecting whether the aspirator should generate vacuum while regulating PCV flow (referred to as a "vacuum source mode") or just regulate PCV flow (referred to as a "PCV valve mode") may be used.

Figure 8:
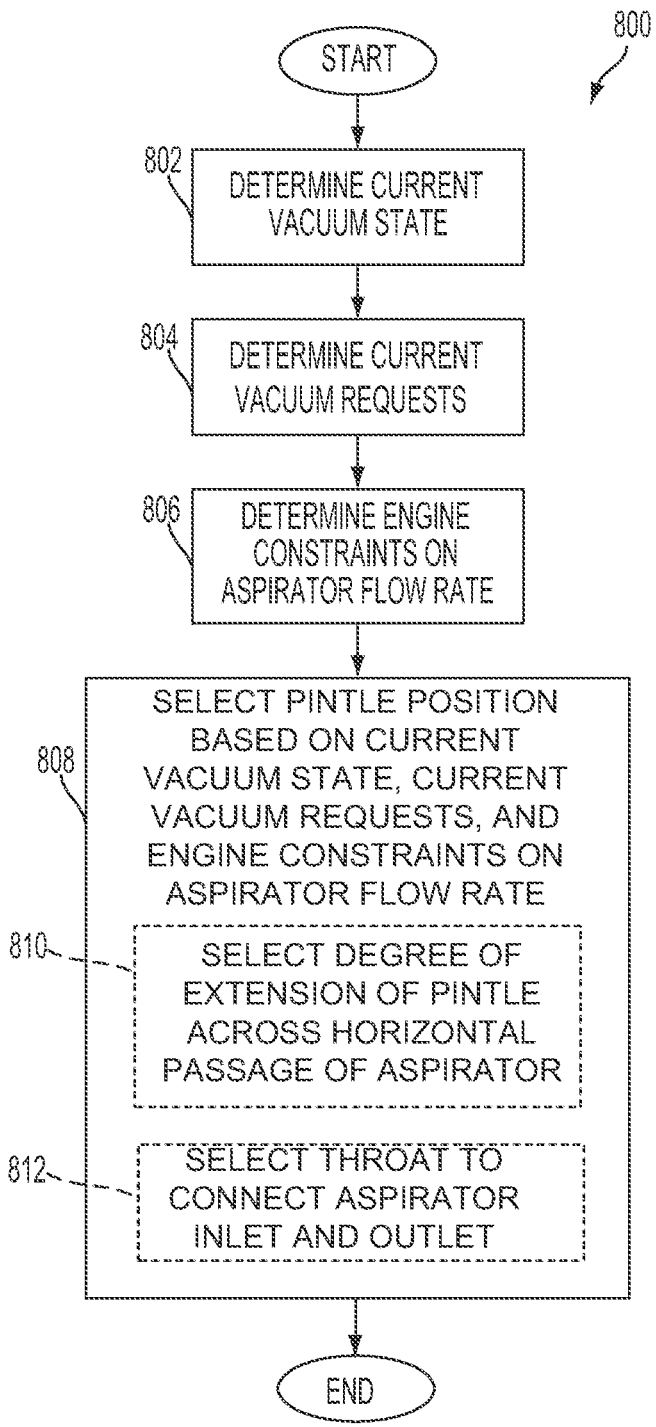
FIG. 8 is an example method for selecting a pintle position, to be used in conjunction with the method of FIG. 6.

If the vacuum source mode is selected at 602, method 600 continues to 604. At 604, method 600 includes selecting pintle position. As detailed below, FIG. 8 shows an example method for selecting pintle position based on current vacuum state, current vacuum requests, and engine constraints on aspirator flow rate. Depending on the embodiment of the pintle, the position selected may be characterized by a degree of extension of the pintle across the horizontal passage of the aspirator, or may correspond to a particular throat of the pintle.

After selection of pintle position, method 600 continues to 606. At 606, method 600 includes controlling the actuator to move the pintle such that it assumes the selected pintle position. The actuator may be an electric solenoid such as actuator 212 depicted in FIG. 2. Alternatively, the actuator may be a vacuum actuator such as actuator 512 depicted in FIG. 5.

After the pintle has been moved into the selected pintle position, method 600 continues to 608. At 608, method 600 includes flowing crankcase gases through the aspirator and storing generated vacuum in a vacuum reservoir. It will be appreciated that step 608 occurs as a result of step 606; that is, the movement of the pintle into the selected pintle position effects the flow of crankcase gases through the aspirator. For example, if the aspirator operating mode was a PCV valve mode prior to execution of method 600, movement of the pintle into the selected pintle position will result in a transition from the metering of crankcase gases through an orifice to the flowing of crankcase gases through the juncture of the horizontal passage (with a cross-sectional flow area dictated either by the degree of extension of the pintle, or by the flow characteristics of a throat positioned at the juncture). Alternatively, if the aspirator operating mode was a vacuum source mode prior to execution of method 600, movement of the pintle into the selected pintle position will result in continued flow of crankcase gases through the horizontal passage at a different rate, if the pintle was already in vacuum source mode but at a different position (and thus with a different flow rate/vacuum generation characteristic) prior to execution of method 600.

After 608, method 600 continues to 610. At 610, method 600 includes determining whether a change in operating conditions has occurred that necessitates a change in aspirator operating mode or a change in pintle position. In one example, methods 700, 708, and/or 800 (as described below with respect to FIGS. 7A, 7B, and 8) may be performed periodically during execution of step 608, and these methods may generate an interrupt when various predetermined changes in engine operating conditions occur. In this case, when the interrupt occurs, method 600 may continues from 608 to 610 to evaluate whether the interrupt occurred due to a change in operating conditions which necessitates a change in aspirator operating mode or pintle position. Alternatively, method 600 may proceed from 608 to 610 after a predetermined time period has elapsed, and step 610 may include performing methods 700, 708, and/or 800 while step 608 continues to be carried out (i.e., the actions of steps 608 and 610 may be carried out concurrently).

If the answer at 610 is NO, method 600 returns to 608 and continues flowing crankcase gases through the aspirator and storing generated vacuum in a vacuum reservoir. However, if the answer at 610 is YES, method 600 returns to 602. In this way, method 600 may be performed repeatedly such that changes in engine operating conditions result in changes in aspirator operating mode or pintle position as appropriate, in a timely manner.

Returning to 602, if the selected aspirator operating mode is a PCV valve mode, method 600 continues to 612 to control the actuator to move the pintle so as to meter crankcase gases through an orifice of the pintle. That is, the actuator moves the pintle such that the aspirator regulates PCV flow but does not generate vacuum. Depending on the embodiment of the pintle, this may include extending or retracting the pintle so as to position the orifice within the horizontal passage, or extending or retracting the pintle such that an orifice throat is positioned within the horizontal passage.

After 612, method 600 continues to 614. At 614, method 600 includes metering crankcase gases through the orifice of the pintle. It will be appreciated that step 614 occurs as a result of step 612; that is, the movement of the pintle so as to meter crankcase gases through an orifice of the pintle effects the metering of crankcase gases through the orifice. For example, if the aspirator operating mode was a vacuum source mode prior to execution of method 600, movement of the pintle to meter crankcase gases through the orifice will result in a transition from the flowing of crankcase gases through the juncture of the horizontal passage (with a cross-sectional flow area dictated either by the degree of extension of the pintle, or by the geometry/flow characteristics of an opening in a throat positioned at the juncture) to the metering of crankcase gases through an orifice.

After 614, method 600 continues to 616. At 616, method 600 includes determining whether a change in operating conditions has occurred that necessitates a change in aspirator operating mode. In one example, methods 700, 708, and/or 800 may be performed periodically during execution of step 614, and these methods may generate an interrupt when various predetermined changes in engine operating conditions occur. In this case, when the interrupt occurs, method 600 may continues from 614 to 616 to evaluate whether the interrupt occurred due to a change in operating conditions which necessitates a change in aspirator operating mode. Alternatively, method 600 may proceed from 614 to 616 after a predetermined time period has elapsed, and step 616 may include performing methods 700, 708, and/or 800 while step 614 continues to be carried out (i.e., the actions of steps 614 and 616 may be carried out concurrently).

If the answer at 614 is NO, method 600 returns to 614 and continues metering crankcase gases through the orifice. However, if the answer at 616 is YES, method 600 returns to 602. In this way, method 600 may be performed repeatedly such that changes in engine operating conditions result in changes in aspirator operating mode as appropriate, in a timely manner.

FIG. 7A shows a first example method 700 for selecting an aspirator operating mode. As described with respect to FIG. 6, method 700 may be performed at step 602 of method 600. Additionally, method 700 may be performed periodically during execution of steps 608 and 614 of method 600, and/or at steps 610 and 616 of method 600.

At 702, method 700 includes determining whether intake manifold pressure is less than a threshold. For example, a sensor may be disposed in the intake manifold to sense intake manifold pressure. Controller 12 may compare the sensed pressure to a threshold. The threshold may be a predetermined threshold, or may be based on atmospheric pressure, currently sensed crankcase pressure, and/or the PCV pressure sensed by vacuum sensor 82. In this way, it may be determined whether engine operating conditions enable vacuum generation at aspirator 24. For example, while the engine is running under light load and moderate throttle opening, intake manifold pressure may be less than a threshold. The threshold may be a currently sensed crankcase pressure. This pressure differential between the crankcase and the intake manifold may cause PCV flow to move through the aspirator such that vacuum may be generated depending on the position of the pintle.

If the answer at 702 is YES, method 700 continues from 702 to 704 to select the vacuum source mode. After 704, method 700 ends.

Otherwise, if the answer at 702 is NO, method 700 continues from 702 to 706 to select the PCV valve mode. For example, if intake manifold pressure is not less than the threshold, it may not be possible to generate vacuum via the aspirator because motive flow of PCV gases through the aspirator may not be sufficient. Accordingly, it may be appropriate under these conditions to meter PCV flow through an orifice of the aspirator pintle rather than to move PCV flow through a vacuum-generating throat or opening in the horizontal passage. After 706, method 700 ends.

FIG. 7B shows a second example method 708 for selecting an aspirator operating mode. As described with respect to FIG. 6, method 708 may be performed at step 602 of method 600. Additionally, method 708 may be performed periodically during execution of steps 608 and 614 of method 600, and/or at steps 610 and 616 of method 600.

At 710, method 708 includes determining whether a flow rate of gases entering the aspirator is constant. For example, a flow rate of crankcase gases entering the aspirator may be periodically sensed by a sensor. The controller may compare the sensed flow rates to determine whether the flow rate is constant (e.g., whether a variance of the flow rate over time exceeds a predetermined threshold).

If the answer at 710 is YES, method 708 continues from 710 to 712 to select the PCV valve mode. For example, the pintle orifice may be sized to correspond to a PCV flow rate expected during certain conditions, and while this flow rate remains constant the PCV flow may be metered through the orifice. After 712, method 708 ends.

Otherwise, if the answer at 710 is NO, method 708 continues from 710 to 714 to select the vacuum source mode. For example, when an amount of blowby gases increases, the flow rate of PCV flow entering the aspirator may increase such that an increased cross-sectional flow area is needed to properly ventilate the crankcase (i.e., relative to the metering orifice used in PCV valve mode). Accordingly, it may be appropriate to switch to the vacuum source mode so as to properly ventilate the crankcase when more blowby gases flow in the PCV line, while advantageously generating vacuum. After 714, method 708 ends.

FIG. 8 shows an example method 800 for selecting pintle position. As described with respect to FIG. 6, method 800 may be performed at step 604 of method 600. Additionally, method 800 may be performed periodically during execution of step 608 and/or step 610 of method 600.

At 802, method 800 includes determining a current vacuum state. For example, controller 12 may receive information from one or more sensors to determine a level of vacuum present at a desired location in the engine. For example, the sensor may be located in vacuum reservoir 94 to sense a level of stored vacuum available for use by a brake booster, FEAD, etc.

After 802, method 800 continues to 804 to determine current vacuum requests. For example, the determination may be based on whether brakes are being actuated by a vehicle operator, whether fuel vapor purging must be performed, whether an amount of vacuum stored in vacuum reservoir 94 is below a predetermined threshold, etc.

After 804, method 800 continues to 806 to determine engine constraints on aspirator flow rate. This determination may be based on a desired intake air-fuel ratio, and/or a volume of blowby gases measured in the crankcase, for example.

After 806, method 800 continues to 808 to select pintle position based on current vacuum state, current vacuum requests, and engine constraints on aspirator flow rate. For example, step 808 may include, at 810, selecting a degree of extension of the pintle across the horizontal passage of the aspirator. Additionally or alternatively, step 808 may include, at 812, selecting a throat to connect the aspirator inlet with the aspirator outlet. In this way, a degree of extension or throat of the pintle may be selected to meet engine constraints on aspirator flow rate while providing an appropriate amount of vacuum for current engine conditions. For example, if stored vacuum is below a threshold and excessive leaning of intake air-fuel ratio must be avoided, the pintle may be extended so as to generate some vacuum without increasing the rate of PCV flow to such an extent that the intake air-fuel ratio becomes too lean. After 808, method 800 ends.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
in a first operating mode, generating vacuum at a vacuum port of an aspirator by at least partially opening the aspirator and providing a motive flow of crankcase gases through the aspirator; and
in a second operating mode, fully closing the aspirator and metering crankcase gases through an orifice of a pintle of the aspirator.

2. The method of claim 1, further comprising selecting an operating mode based on vacuum state, vacuum requests, and PCV flow rate constraints.

3. The method of claim 2, wherein opening and closing the aspirator comprises controlling a pintle position relative to a horizontal flow passage of the aspirator.

4. The method of claim 3, wherein the aspirator regulates PCV flow and generates less to no vacuum at the vacuum port during the second operating mode.

5. The method of claim 4, further comprising controlling the pintle position with an actuator based on engine operating conditions.

6. An engine system, comprising:
only one aspirator which comprises a horizontal passage with a converging inlet coupled to a crankcase and a diverging outlet coupled to an intake manifold, an actuator moving a pintle within a gap between the inlet and outlet, and a vacuum port connected to the gap opposite the actuator,
wherein the pintle comprises a vertical stack of throats, the inlet and outlet connectable via each throat depending on pintle position.

7. The system of claim 6, wherein each throat has a different vacuum generation characteristic and a different flow rate characteristic.

8. The system of claim 7, wherein the pintle position is adjusted based on engine operating conditions, the engine operating conditions comprising vacuum state, vacuum requests, and PCV flow rate constraints.

9. The system of claim 8, wherein the pintle comprises an orifice throat and a converging-diverging throat, and wherein only the aspirator regulates PCV flow in the system.

10. The system of claim 9, wherein the aspirator is a vacuum source when the converging-diverging throat connects the inlet and outlet.

11. The system of claim 10, wherein the vacuum port connects the aspirator to a vacuum reservoir via a check valve.

12. The system of claim 11, wherein the actuator is an electric actuator.

13. An engine method, comprising:
adjusting a pintle position of an aspirator to regulate PCV flow and generate variable levels of vacuum, the aspirator comprising a horizontal passage with a converging inlet coupled to a crankcase and a diverging outlet coupled to an intake manifold, a vertical passage extending through the horizontal passage at a juncture of the inlet and the outlet, and an actuator in the vertical passage controlling a horizontal cross-sectional flow area at the juncture via a pintle with at least one orifice.

14. The method of claim 13, wherein the aspirator regulates PCV flow when the orifice is disposed in the horizontal passage, and wherein the aspirator generates vacuum when the orifice is not disposed in the horizontal passage.

15. The method of claim 14, wherein PCV flow and vacuum generation characteristics at the juncture depend on which one of a plurality of throats of the pintle is currently positioned across the juncture.

16. The method of claim 14, wherein the horizontal cross-sectional flow area at the juncture depends on a degree of extension of the pintle across the horizontal passage.

17. The method of claim 16, wherein the actuator controls the degree of extension of the pintle across the horizontal passage to achieve a desired vacuum generation characteristic and a desired flow rate characteristic.

18. The method of claim 17, wherein the vertical passage comprises a vacuum port at an opposite side of the juncture from the actuator, wherein crankcase gas flow through the horizontal passage generates vacuum at the vacuum port when the horizontal cross-sectional flow area at the juncture is greater than a threshold, and wherein the vacuum port connects the aspirator to a vacuum reservoir via a check valve.

19. The method of claim 18, wherein the actuator is an electric actuator or a pneumatic actuator.

20. A method for an engine, comprising:
- in a first operating mode, generating vacuum at a vacuum port of an aspirator by providing a motive flow of crankcase gases through a converging-diverging passage of the aspirator; and
- in a second, different operating mode, metering crankcase gases through a fixed-size orifice more restrictive than the converging-diverging passage.

* * * * *